Patented Sept. 27, 1938

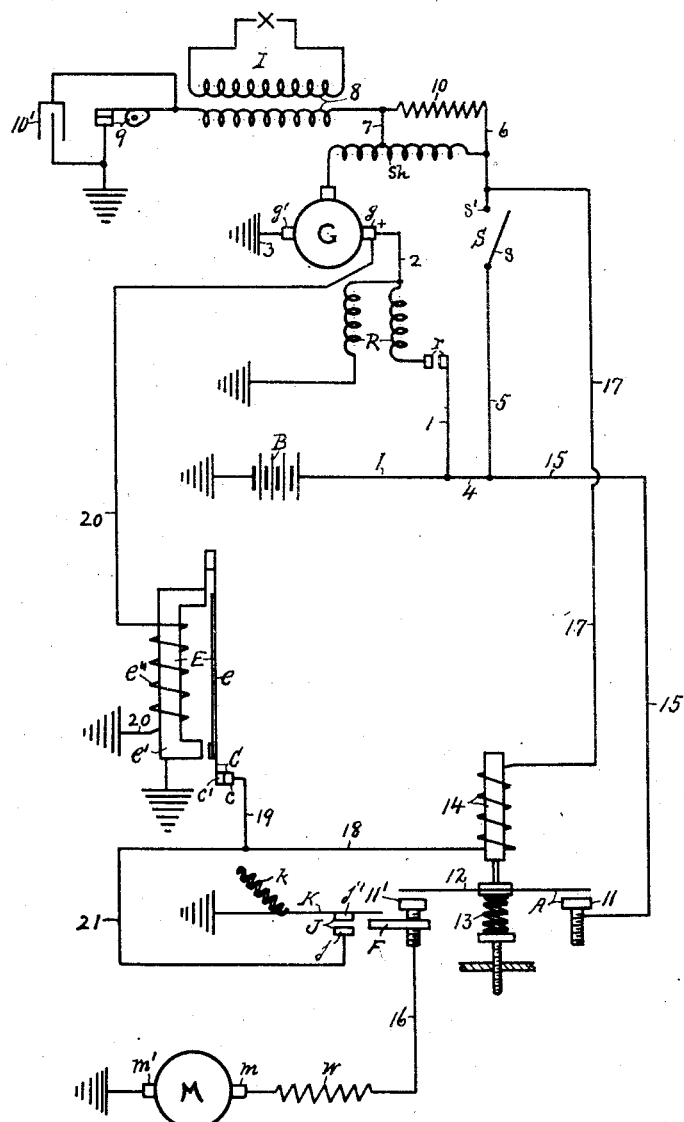

2,131,026

UNITED STATES PATENT OFFICE 2,131,026

IGNITION AND STARTING SYSTEM FOR AUTOMOBILES

Albert E. Doman, Syracuse, N. Y., assignor, by mesne assignments, to Eclipse Machine Company, Elmira Heights, N. Y., a corporation of New York Application November 30, 1931, Serial No. 578,029

6 Claims. (Cl. 290—37)

This invention relates to certain improvements in ignition and starting systems for internal combustion engines to be used more particularly as the motive power for automobiles and other motor vehicles in which the speeds of operation are widely variable.

These machines are usually equipped with a storage battery and an engine-driven electric generator for supplying current to the ignition system and other translating devices, together with an electric motor for starting the engine and adapted to be operated by current from the storage battery through the medium of a suitable electric switch under the control of the operator.

It has also been proposed to control the battery current to the starting motor through the medium of a normally closed self-closing supplemental switch which is connected in the starting motor circuit in series with the manually operated master switch and is adapted to be automatically opened by suction from the intake manifold of the engine or by some other equivalent means as soon as the engine begins to operate under its own power.

This method, however, so far as I am aware, has proven to be unreliable and therefore unsatisfactory for the reason that it cannot be depended upon to open the supplemental switch and to hold it open to prevent re-engagement of the starting motor with the engine when the latter is operating under low speeds or until the engine has actually stopped.

The main object of the present invention is to provide simple and efficient means controlled by a single manually-operated electric switch for automatically and instantly operating the starting motor to start the engine in case the latter should stop, by stalling or otherwise, and also to automatically open the motor circuit immediately upon the starting of the engine, and to keep said circuit open as long as the engine is operating under its own power at any speed.

One of the specific objects is to control the operation of the starting motor through the medium of an automatic switch operating in conjunction with the manually operated master switch in the battery circuit and also to utilize the battery current for exciting the field of the generator for increasing the voltage output of said generator particularly under its lower speeds as determined by the speed of the engine when operating under its own power.

Another specific object is to utilize this increased voltage of the generator for the operation of an electromagnetic switch for opening the battery circuit to the starting motor and thereby to prevent the operation of the latter while the engine and generator are operating at any speed.

Other objects and uses relating to specific parts of the system will be brought out in the following description.

The ignition and starting system is represented diagrammatically in the drawing and comprises a dynamo electric machine or generator G of the third brush type and a storage battery B for supplying current to a suitable ignition device I and to a starting motor M through the medium of a master switch S and other electric elements hereinafter described.

The battery B is connected across the main brush circuit of the generator G through the medium of a conventional reverse relay switch R which is arranged to automatically close said circuit through the battery for charging purposes when the voltage output of the dynamo exceeds that of the battery as determined by the speed of the engine.

For this latter purpose, the normally open contacts r of the relay switch R are connected by wires 1 and 2 respectively, to the positive pole of the battery B and to the positive brush g of the dynamo G, the other side of the relay R and the other dynamo brush g' being grounded at 3 to complete the dynamo circuit through the relay and battery.

The positive pole of the battery and also the positive brush g of the dynamo are connected by wires 1, 4 and 5 to one of the contacts s of the switch S while the other contact s' is connected to the shunt field winding sh of the dynamo G for separately exciting the same for a purpose presently described.

The ignition system I is similar to that set forth in my Patent No. 1,957,393, May 1st, 1934, and therefore need not be specifically described herein except that it is connected by wires 6 and 7 to the contact s' and to the shunt field winding sh respectively and that it includes a spark coil 8 and a circuit breaker 9 together with a non-inductive electrical resistance 10 and a condenser 10' arranged somewhat in the relation shown.

The starting motor M may also be of the conventional type and, when the master switch S is closed, is adapted to be operated by current from the battery B through the medium of a normally open supplemental switch A having a pair of relatively fixed contacts 11 and 11' and a movable contact member 12 which is normally held in its open position by a spring 13, but is adapted to be closed upon the contacts by means of an electromagnet or solenoid 14.

One of the contacts as 11 is connected to the positive pole of the battery B by means of a wire 15 and wires 4 and 1 while the other contact member as 11' is connected to one of the brushes m through the medium of a wire 16 and the series winding w of the motor, the other brush as m' being grounded to complete the battery circuit through the motor and return for operating said motor when the supplemental switch member 12 is closed upon the contacts 11 and 11' by the energizing of the electromagnet 14.

For this latter purpose, one end of the winding of the magnet 14 is connected by a wire 17 to the contact s' of the switch S and thence through said switch (when closed) and wires 5, 4 and 1 to the positive pole of the battery B, the other end of said winding being connected by wires 18 and 19 to one of the contacts as c of a normally closed switch C.

The other contact as c' of the switch C is mounted upon an armature conductor e which, in turn, is electrically connected to the grounded core e' of an electromagnet E having its winding e'' connected by wires 20 across the main brush circuit of the dynamo G for a purpose presently described.

A magnetic element F surrounds the contact member 11' and is adapted to be energized by the battery current passing through said contact member and through the wire 16 to the starting motor M when the switch A is closed by the energizing of the electromagnet 14.

The winding of the electromagnet 14 is connected through the wire 18 and an additional wire 21 to one of the contacts as j of a normally open electric switch J having its other contact j' mounted upon a movable armature member K which may be supported in any suitable manner with one end in attractive relation to the magnet F so that when the magnet is energized immediately following the closing of the switch A, the armature K will be operated to close the switch J against the action of a retracting spring k, said armature being grounded to complete the battery circuit through the then closed switch J.

The spring k may be adjusted to open the switch J when the current required for operating the starting motor M is reduced to a suitable value or as soon as the engine begins to operate under its own power.

*Operation*

When it is desired to start the engine, the switch S is first closed, thus causing a part of the battery current to flow through wires 1, 4 and 5, and switch S and thence through the shunt field winding sh of the generator G and return to the battery for separately exciting the field winding and thereby increasing the voltage output of the generator for ignition purposes when the engine is operating at minimum speeds under its own power.

This closing of the switch S also diverts a part of the battery current through wire 17 and the winding of the electro-magnet 14 and thence through wire 18 and the then closed switch C, armature e and core e' of the electromagnet E and return to the battery, thereby energizing the electromagnet 14 to close the switch A which causes a part of the battery current to then flow through wire 15, closed switch A, wire 16 and series winding w of the motor M and return to the battery for operating said motor to start the engine in the conventional manner.

Immediately upon the closing of the switch A the passage of the battery current through the contact 11' and magnet F will energize said magnet to attract the armature K and thereby to close the switch J which allows said current to flow from the winding of the electromagnet 14 through wires 18 and 21 and thence through the closed switch J and armature K and return to the battery B for keeping the switch A closed and the starting motor in action until the engine begins to operate under its own power.

The fact that the shunt field sh of the dynamo G is separately excited by current from the battery B immediately upon the closing of the switch S, enables the engine-driven dynamo to quickly build up an increased voltage in the ignition circuit under the lowest speed of the engine to assure a definite voltage under all speeds before the relay switch R is closed in the manner previously explained.

It is desirable, however, to stop the operation of the starting motor as soon as the engine begins to operate under its own power to reduce the liability of impairing the driving connections between the motor and engine and also to reduce the demand upon the battery, and for this purpose the winding e'' of the electromagnet E is connected across the main brushes of the dynamo G so that the dynamo current flowing through said winding will energize the magnet and thereby attract the armature e to open the switch C.

This opening of the switch C will take place almost immediately following the beginning of the operation of the engine-driven dynamo G due to the extra excitation of the field winding sh by the battery current.

It will be noted however, that even though the switch C is opened in the manner described, the switch members K and 12 will remain closed temporarily or until the power demand of the motor M is reduced by the operation of the engine under its own power sufficiently to allow the spring k to open the switch member K.

This opening of the switch K breaks the battery circuit through the winding of the electromagnet 14, thereby de-energizing the magnets 14 and F and allowing the spring 13 to open the switch A for stopping the motor M.

The opening of the member 12 takes place instantly upon the opening of the switch J which also takes place immediately upon the beginning and during the operation of the engine under its own power, thereby preventing reclosing of the switch 12 and resultant operation of the motor M until the engine actually stops, or until the dynamo voltage in the coil e'' is sufficiently low to allow the spring e to close the switch C.

That is, if the operation of the engine and dynamo should stop while the master switch S is still closed, the electro-magnet E will be instantly de-energized to allow the switch C to be returned to its normally closed position, resulting in the successive re-energizing of the magnets 14 and F and consequent automatic operation of the motor M for restarting the engine without any further effort on the part of the operator, and this automatic operation of the starting motor will take place whenever and only when the engine ceases to operate under its own power while the switch S remains closed.

It is equally obvious that as soon as the engine begins to operate under its own power with the switch S closed, the switches C, A, and J will be again opened to stop the motor M, and will remain open as long as the operation of the engine under it own power continues or until the master switch S is opened by the operator.

What I claim is:

1. In an electric ignition and starting system for internal combustion engines, an electric battery, an ignition circuit deriving current from the battery and including therein a master switch adapted to be closed and to remain closed at will, a second battery circuit including therein a starting motor and a self-opening starter switch, a third battery circuit receiving current from the ignition circuit at a point beyond the master switch and including therein an electro-magnet adapted, when energized, to close the starter switch for starting the motor and engine, said third circuit including therein a self-closing switch and having a branch circuit including therein a self-opening switch, an engine-driven electric generator having an excitation field connected to the ignition circuit at a point beyond the master switch whereby the field will be excited simultaneously with the energizing of said magnet, a second electro-magnet responsive to the current energy in the starter circuit for closing the switch in the branch circuit, means responsive to the generator current for opening the self-closing switch immediately following the closing of the switch in the branch circuit, and means for opening the second switch when the energy in the second magnet falls below a predetermined value due to the decreasing load upon the starter motor, thereby allowing the starter switch to open.

2. The combination with an internal combustion engine, of an automatic starting system therefor, comprising a starting motor, a normally broken starting motor circuit, an electro-magnetic switch for closing the starting motor circuit, said switch having an actuating coil, a normally closed control circuit for energizing said coil, an electric generator driven by said engine, a battery connected for separately exciting said generator, means responsive to the terminal voltage of said generator for connecting said generator for self-excitation over a range of voltages above a predetermined value, means responsive to the generated voltage for opening said control circuit when the generator rotates, and a second control circuit for said coil including a relay switch actuated in accordance with current flowing in the starting motor circuit for maintaining the starting motor circuit energized until the starting motor is relieved of its load of cranking the engine.

3. The combination with an internal combustion engine, of an automatic starting system therefor, comprising a starting motor, a normally broken starting motor circuit, an electro-magnetic switch for closing the starting motor circuit, said switch having an actuating coil, an ignition circuit for said engine, said ignition circuit having a manually operable switch, a control circuit for said coil adapted to be energized upon the closing of said ignition switch, an electric generator driven by said engine, a battery connected for separately exciting said generator, means responsive to the terminal voltage of said generator for connecting said generator for self-excitation over a range of voltages above a predetermined value, means responsive to the generated voltage for opening said control circuit when the generator rotates, and a second control circuit for said coil including a relay switch actuated in accordance with current flowing in the starting motor circuit for maintaining the starting motor circuit energized until the starting motor is relieved of its load cranking the engine.

4. In an automatic starting system for internal combustion engines, a starting circuit including a magnetic starting switch, a control circuit for said starting switch including two sets of contacts in parallel, one set being normally closed and the other set normally open, an electro-magnet in the starting circuit energized by the cranking current to close the second set of contacts, means actuated by rotation of the engine for opening the first set of contacts, and means for overcoming the force of said electro-magnet and opening the second set of contacts when the engine starts.

5. In an electrical system for internal combustion engines, an engine-driven generator, a starting system including a starting motor and a magnetic switch therefor, a control circuit for said magnetic switch including two circuit-closing devices in parallel, one of which is normally closed and the other normally open, means energized by closure of said magnetic switch for closing the second said device, means energized by said generator for opening the first said device, and means for overcoming said closing means and opening said second device when the engine becomes self-operative.

6. In an electrical system for internal combustion engines, an engine-driven generator, a starting system including a starting motor and a magnetic switch therefor, a control circuit for said magnetic switch including two relays with their contacts in parallel, one relay being normally closed and the other normally open, the first relay having a coil energized by said generator for opening its contacts when the engine is rotated, the second relay having a coil in series with the starting motor for closing its contacts when the motor cranks the engine, and a spring for opening said second relay when its coil is weakened by the relief of the load on the starting motor when the engine starts.

ALBERT E. DOMAN.